United States Patent
McGuffin

(10) Patent No.: US 8,881,799 B2
(45) Date of Patent: Nov. 11, 2014

(54) DOWNHOLE GAS GENERATOR WITH MULTIPLE COMBUSTION CHAMBERS

(71) Applicant: K2 Technologies, LLC, Fort Worth, TX (US)

(72) Inventor: Rom McGuffin, Boulder, CO (US)

(73) Assignee: K2 Technologies, LLC, Ft. Worth, TX (US)

( * ) Notice: Subject to any disclaimer, the term of this patent is extended or adjusted under 35 U.S.C. 154(b) by 0 days.

(21) Appl. No.: 13/954,578

(22) Filed: Jul. 30, 2013

(65) Prior Publication Data

US 2014/0034289 A1    Feb. 6, 2014

Related U.S. Application Data

(63) Continuation-in-part of application No. 13/942,235, filed on Jul. 15, 2013, now abandoned.

(60) Provisional application No. 61/679,434, filed on Aug. 3, 2012.

(51) Int. Cl.

| | |
|---|---|
| *E21B 36/02* | (2006.01) |
| *F22B 1/18* | (2006.01) |
| *E21B 43/243* | (2006.01) |
| *F02C 7/12* | (2006.01) |
| *E21B 43/24* | (2006.01) |
| *F22B 1/00* | (2006.01) |

(52) U.S. Cl.
CPC ... *F02C 7/12* (2013.01); *F22B 1/18* (2013.01); *E21B 43/243* (2013.01); *E21B 36/02* (2013.01); *E21B 43/24* (2013.01); *F22B 1/003* (2013.01)

USPC .................................................. 166/59; 166/57

(58) Field of Classification Search
CPC .......................................................... E21B 36/02
USPC ........................................................ 166/57, 59
See application file for complete search history.

(56) References Cited

U.S. PATENT DOCUMENTS

| | | |
|---|---|---|
| 3,721,297 A | 3/1973 | Challacombe |
| 4,382,771 A | 5/1983 | Carr |
| 4,385,661 A | 5/1983 | Fox |
| 4,558,743 A | 12/1985 | Ryan et al. |
| 4,633,951 A | 1/1987 | Hill et al. |
| 5,259,341 A | 11/1993 | Person |
| 8,387,692 B2 | 3/2013 | Tilmont et al. |
| 2004/0069245 A1 | 4/2004 | Griffin et al. |
| 2006/0000427 A1 | 1/2006 | Kraus et al. |
| 2008/0053655 A1 | 3/2008 | Retallick et al. |
| 2011/0000666 A1 | 1/2011 | Couto |
| 2011/0127036 A1 | 6/2011 | Tilmont et al. |
| 2012/0103604 A1* | 5/2012 | Mohamed et al. ......... 166/272.1 |

* cited by examiner

*Primary Examiner* — Giovanna Wright
(74) *Attorney, Agent, or Firm* — Eric Karich

(57) ABSTRACT

A multiple chamber gas generator system has a plurality of gas generators shaped to fit within the borehole. Each of the gas generators having an elongate combustion chamber. A gas flow control system is operably installed for supplying gas to the elongate combustion chambers of each of the gas generators. The system further includes a control computer having a control program operatively installed thereupon, the control program functioning to control the operation of the gas flow control system and to selectively turn on or off each of the gas generators to regulate the volume of gasses being generated in response to changes in pressure within the borehole.

16 Claims, 13 Drawing Sheets

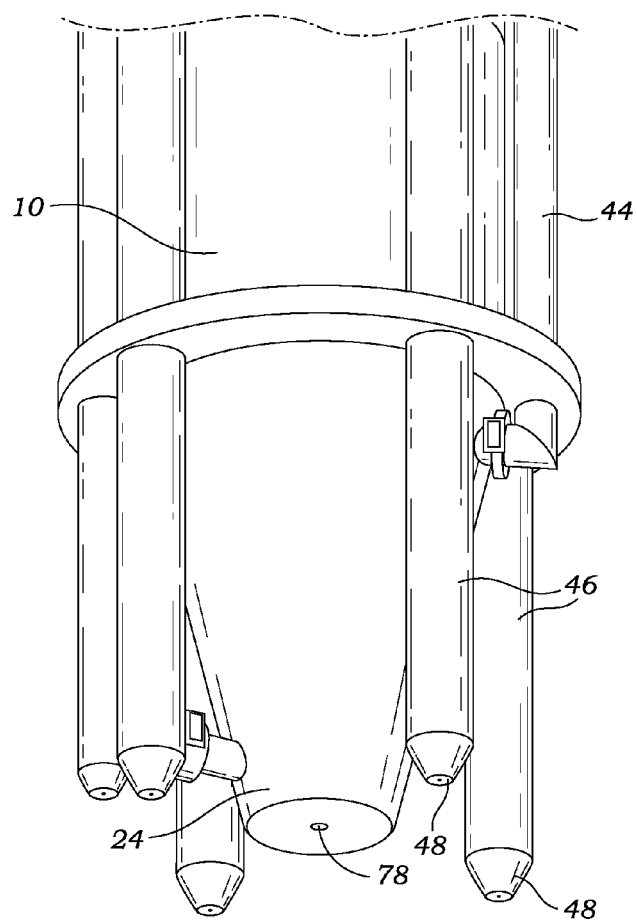
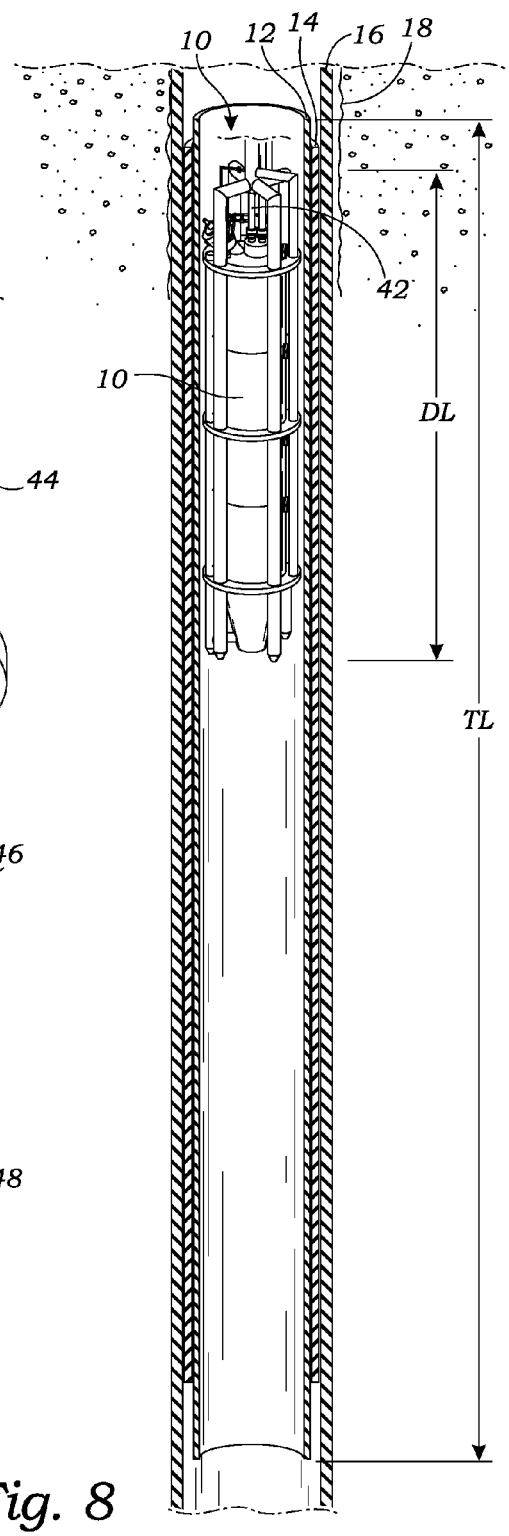
Fig. 7
Fig. 8

DOWNHOLE GAS GENERATOR WITH MULTIPLE COMBUSTION CHAMBERS

CROSS-REFERENCE TO RELATED APPLICATIONS

This application for a utility patent is a continuation-in-part of a previously filed utility patent, currently pending, having the application Ser. No. 13/942,235, filed Jul. 15, 2013. This application also claims the benefit of U.S. Provisional Application No. 61/679,434, filed Aug. 3, 2012.

BACKGROUND OF THE INVENTION

1. Field of the Invention

This invention relates generally to gas generators, and more particularly to a downhole gas generator having multiple independently controlled combustion chambers.

2. Description of Related Art

The following art defines the present state of this field:

Challacombe, U.S. Pat. No. 3,721,297, teaches a system for cleaning wells that includes a series of gas generating modules and explosive caps. The explosive caps are used for generating a series of repeated mild explosions and a series of pressure pulsations, which provides both repetitive shock and repetitive sustained fluid pulsations. The shock is required to break up and loosen various formations and materials formed in the well casing perforations and interstices of surrounding formation. The pulsations achieve repeated flow of the well fluid back and forth through the casing perforations and surrounding formation to thereby remove particles of plugging material that are loosened by the shock waves. The assembly of gas producing modules and explosive caps is interconnected in a string and arranged so that the burning or explosion of one element of the string will, itself, initiate the burning or explosion of the succeeding element, thus eliminating the need for multiple control lines for the desired sequential ignition.

Can, U.S. Pat. No. 4,382,771, teaches a gas and steam generator for use in generating electricity. The generator includes a linear series of combustion chambers wherein water in combination with combustible materials is burned. Each combustion chamber is provided with a reduced nozzle-type outlet for creating great pressures and temperatures within the respective chambers, and each combustion chamber being arranged for receiving combustible materials therein for burning thereof. The initial combustion chamber preferably receives a fuel-oxygen mixture at the inlet end thereof for ignition, with the products of the combustion being maintained at a high pressure and temperature by the restrictive nozzle-type outlet of the chamber. Steam and additional combustible materials are introduced at the nozzle outlet of the chamber for ignition and passage into a next stage combustion chamber whereby additional heat and force is produced for ultimate delivery of great power for a work operation.

Hill et al., U.S. Pat. No. 4,633,951, teaches multiple combustion gas generating units that each use rocket fuel type propellants disposed in a well casing at preselected depths. The well casing is filled with a compressible hydraulic fracturing fluid comprising a mixture of liquid, compressed gas, and propant material and precompressed to a pressure of about 1,000 psi (or more) greater than the fracture extension pressure at the depth of the zone to be fractured. At least one of the gas generating units is equipped with perforating shaped charges to form fluid exit perforations at the selected depth of the fracture zone. The gas generating units are simultaneously ignited to generate combustion gasses and perforate the well casing. The perforated zone is fractured by the rapid outflow of an initial charge of sand free combustion gas at the compression pressure followed by a charge of fracturing fluid laden with propellant material and then a second charge of combustion gas.

Tilmont et al., U.S. Pat. No. 8,387,692, teaches a downhole steam generation apparatus that includes an injection section, a combustion section, and an evaporation section. The injection section may include a housing, injector elements, and injector plate.

Ryan et al., U.S. Pat. No. 4,558,743, teaches a steam generator for producing steam in a well casing for injection into a borehole for use in secondary and tertiary recovery of hydrocarbons. Fuel is injected axially into a combustion chamber having a reduced orifice in the bottom thereof and oxygen is introduced tangentially from a plurality of ports in the top of the combustion chamber to create a stable vortex flame. A portion of the walls of the combustion chamber are formed from a porous, sintered stainless steel cylinder through which water is pumped to cool the walls of the chamber and to form steam. The combustion products are mixed with a water mist in a steam generating section to form steam.

Fox, U.S. Pat. No. 4,385,661, teaches an apparatus for generation of steam in a borehole. The system includes a feedback preheater for the fuel and water before entering the combustor assembly. First, combustion gases are conducted from the combustion chamber to locations in proximity to the water and fuel supplies. Secondly, both hot combustion gases and steam are conducted from the borehole back to the water and fuel supply. The water used for conversion to steam is passed in a countercurrent manner through a plurality of annular water flow channels surrounding the combustion chamber. In this manner, the water is preheated, and the combustion chamber is cooled simultaneously, thereby minimizing thermal stresses and deterioration of the walls of the combustion chamber. The water is injected through slotted inlets along the combustion chamber wall to provide an unstable boundary layer and stripping of the water from the wall for efficient steam generation. Pressure responsive doors are provided at the steam outlet of the combustor assembly. The module is positioned in the water flow channel to maintain a relatively constant, controlled temperature.

Griffin et al., U.S. 20040069245, teaches a steam generator for reacting a stoichiometric mixture of hydrogen and oxygen, and injecting water into the hot reaction gases. The generator includes a pilot ignition chamber, a combustion and evaporation chamber with reaction zone, an evaporation zone and outlet nozzle, and a catalytic afterburning chamber. The figure also illustrates the feed devices for supplying a fuel, an oxidizing agent and water.

Couto, U.S. 20110000666, teaches a gas generator which generates a vitiated steam, which is a mix of water steam with combustion gases. The device of this invention may also be attached in petroleum wells, making feasible the extraction of petroleum from the mature wells. The device includes a vaporization chamber attached to the combustion chamber of a rocket engine, said combustion chamber is externally involved by a cooling system, and the nozzle includes spray water injectors.

Other references included as a matter of general interest include the following: Tilmont, et al., U.S. 2011/0127036; Retallick, et al., U.S. 2008/0053655; Kraus et al., U.S. 2006/0000427; and Person, 1993/U.S. Pat. No. 5,259,341. The above-described references are hereby incorporated by reference in full.

The prior art teaches the combustion of a fuel for the production of steam for injection into a petrochemical reservoir to force the petrochemicals out through a well or other access point. The prior art systems struggle, however, to adjust the amount of gas injected so that the formation pressure does not exceed the capabilities of the gas generator, especially in formations that are not very porous. The prior art does not teach a gas generator having multiple combustion chambers that can be independently controlled, so that the output of gasses can be controlled to not exceed predetermined pressures. The present invention fulfills these needs and provides further advantages as described in the following summary.

SUMMARY OF THE INVENTION

The present invention teaches certain benefits in construction and use which give rise to the objectives described below.

The present invention provides a multiple chamber gas generator system for generating gasses in a borehole for use in the recovery of petroleum products. The multiple chamber gas generator system includes a plurality of gas generators shaped to fit within the borehole, each of the gas generators having an elongate combustion chamber; a gas flow control system operably installed for supplying gas to the elongate combustion chambers of each of the gas generators; and a control computer having a computer processor, a computer memory, and a control program operatively installed in the computer memory. The control program functions to control the operation of the gas flow control system and to selectively turn on or off each of the gas generators to regulate the volume of gasses being generated in response to changes in pressure within the borehole.

A primary objective of the present invention is to provide a multiple chamber gas generator system having advantages not taught by the prior art.

Another objective is to provide a multiple chamber gas generator system that includes multiple combustion chambers that can be independently controlled, so that the output of gasses into the formation can be controlled to maintain pressure within the borehole within a predetermined range of pressures.

A further objective is to provide a multiple chamber gas generator system that can function within a heterogeneous reservoir that includes areas of low permeability, without fracturing the reservoir.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 7 is close up of the exhaust end of the gas generator, illustrating the restricted orifice and the additional water injectors;

FIG. 8 is a sectional view of the gas generator operably mounted in a steam injection tube in a borehole;

DETAILED DESCRIPTION OF THE INVENTION

The above-described drawing figures illustrate the invention, a gas generator 10 for extracting petroleum products present in an underground reservoir.

Figures 1, 2:
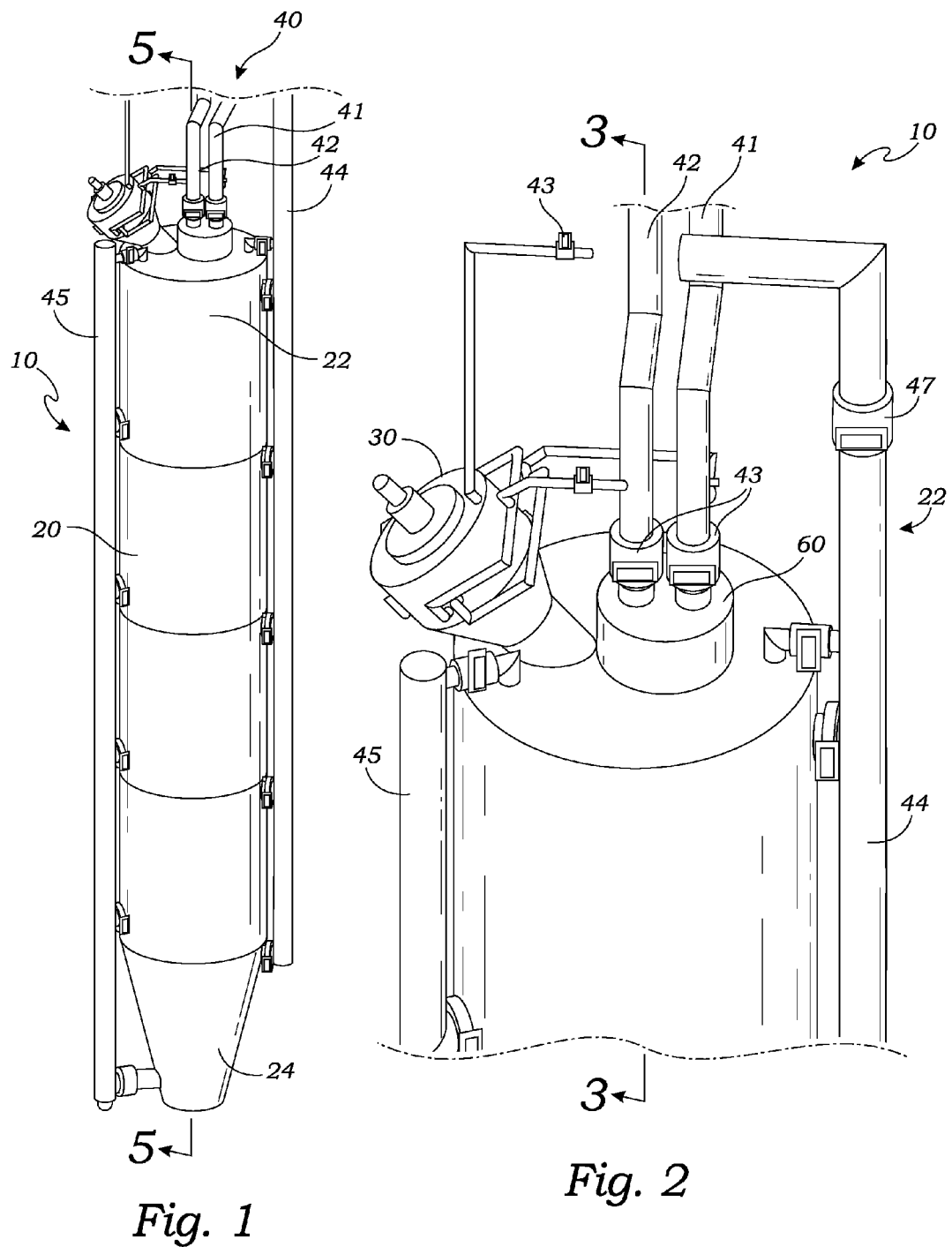
FIG. 1 is a perspective view of a gas generator according to one embodiment of the present invention, the gas generator having a combustion end and an exhaust end.
FIG. 2 is a perspective view of the combustion end of the gas generator.

FIG. 1 is a perspective view of one embodiment of a gas generator 10. As shown in FIG. 1, the gas generator 10 includes a combustion housing 20 for containing a combustion process which makes high-pressure steam for injection into the reservoir. The combustion housing 20 may be an elongate combustion housing 20. The elongate combustion housing 20 includes a combustion end 22 and an exhaust end 24, which are described in greater detail below. The gas generator 10 burns a fuel and an oxidizing agent to produce the high pressure gasses that are used to extract the petroleum products. In the current embodiment, the fuel is hydrogen, and the oxidizing agent is oxygen. In the following disclosure we refer to the use of hydrogen and oxygen, but it should be understood that alternative fuels (e.g., natural gas, other hydrocarbons, etc.) may be used, and alternative oxidizing agents (e.g., ozone, hydrogen peroxide, etc.) may be used, according to the knowledge of one skilled in the art.

For purposes of this application, the term "petroleum products" is broadly defined to include any form of hydrocarbons, chemicals, and/or any other similar or related fluids that may be desirable to extract from underground formations.

As illustrated in FIG. 1, the elongate combustion housing 20 is operably connected with supply lines 40, in this case a hydrogen line 41, an oxygen line 42, and an inlet water line 44. There is also an outlet water line 45 for the removal of heated water from the elongate combustion housing 20. The supply lines 40 are used to transfer gases and/or liquids from the surface to the gas generator 10, as described in greater detail below. In this embodiment, the hydrogen line 41 and the oxygen line 42 are used to provide the fuel and the oxidizing agent for combustion, and the inlet water line 44 is used to provide coolant for cooling the elongate combustion housing 20.

The combustion end 22 generally refers to where hydrogen and oxygen from the hydrogen line 41 and the oxygen line 42 mix and combustion originates. The exhaust end 24 is the end where the gasses exit the elongate combustion housing 20 and are injected into the reservoir. While FIG. 1 illustrates one embodiment of the gas generator 10, those skilled in the art may devise alternative embodiments, and these alternative or equivalent are considered within the scope of the present invention.

Figure 3:
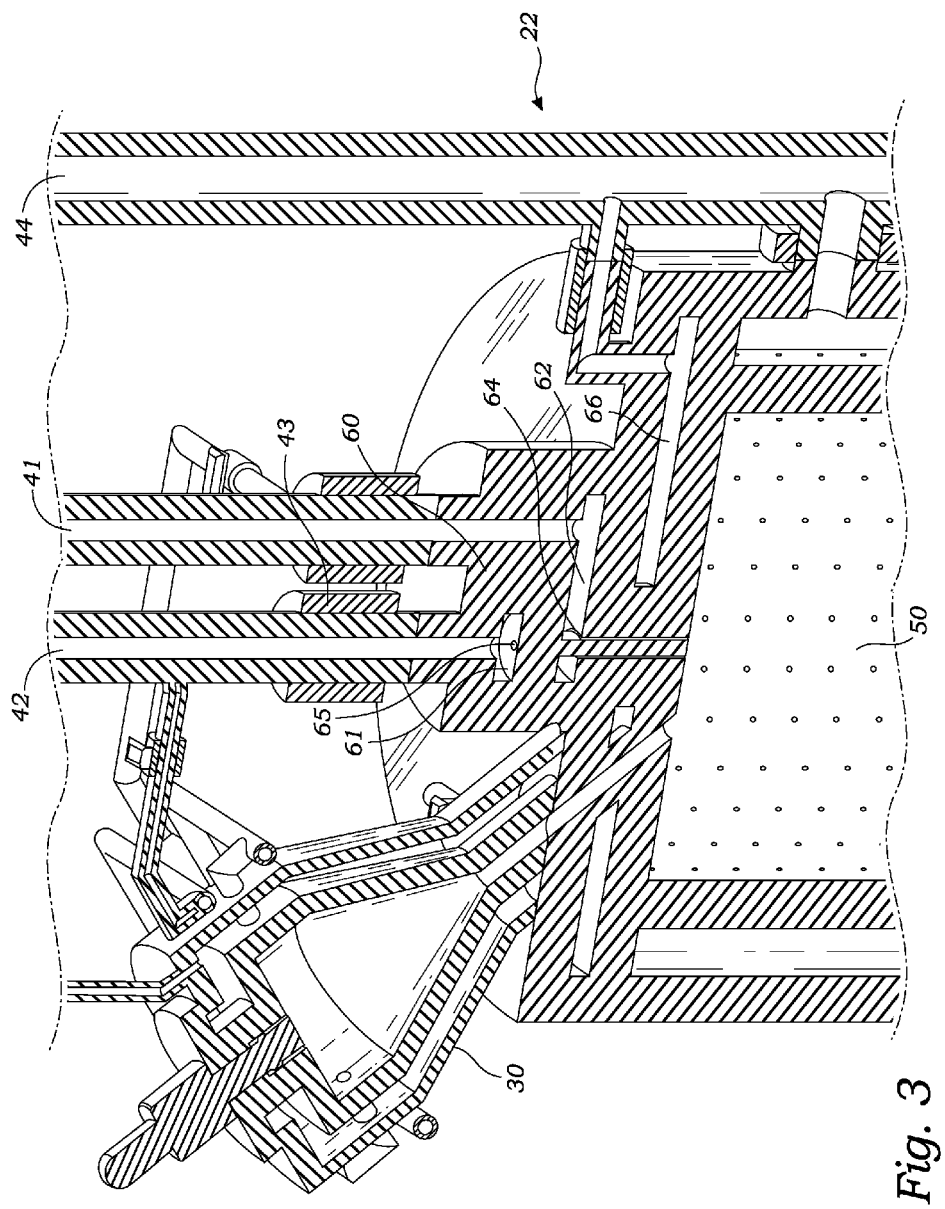
FIG. 3 is a sectional view thereof taken along line 3-3 in FIG. 2.

FIG. 2 is a perspective view of the combustion end 22 of the gas generator 10. FIG. 3 is a top perspective sectional view thereof taken along line 3-3 in FIG. 2. As illustrated in FIGS. 2 and 3, the gas generator 10 includes an ignition system 30 for initially igniting the oxygen and hydrogen in the combustion chamber 50. In the present embodiment, the ignition system 30 is a device which accepts gas from the hydrogen line 41 and the oxygen line 42 and combines them into a mixture. The flammable mixture is then ignited by a pulsed electrical current, wherein the gas ignites and expands into an elongate combustion chamber 50 for initiating combustion within the gas generator 10. While one embodiment of the ignition system 30 is shown, alternative ignition devices known in the art may also be used, and should be considered within the scope of the present invention.

Also as shown in FIG. 2, the inlet water line 44 may include an inline water valve 47 for controlling the water flow therethrough. The inline water valves 47 may be any form of valve, mass flow controllers for fine control of water flow, or any other equivalent type of device. While one embodiment of the inline water valves 47 is shown, those skilled in the art may devise alternative embodiments, and these alternative or equivalent are considered within the scope of the present invention.

Also as shown in FIGS. 2 and 3, the hydrogen line 41, the oxygen line 42, and/or any other gas lines, may contain inline gas valves 43. The inline gas valves 43 are used for controlling the gas flow rate through a gas line. The inline gas valves 43 may be any form of valve, mass flow controller (for fine control of gas flow), or any other equivalent mechanism. While one embodiment of the inline gas valves 43 is shown, those skilled in the art may devise alternative embodiments, and these alternative or equivalent are considered within the scope of the present invention.

Figure 4:
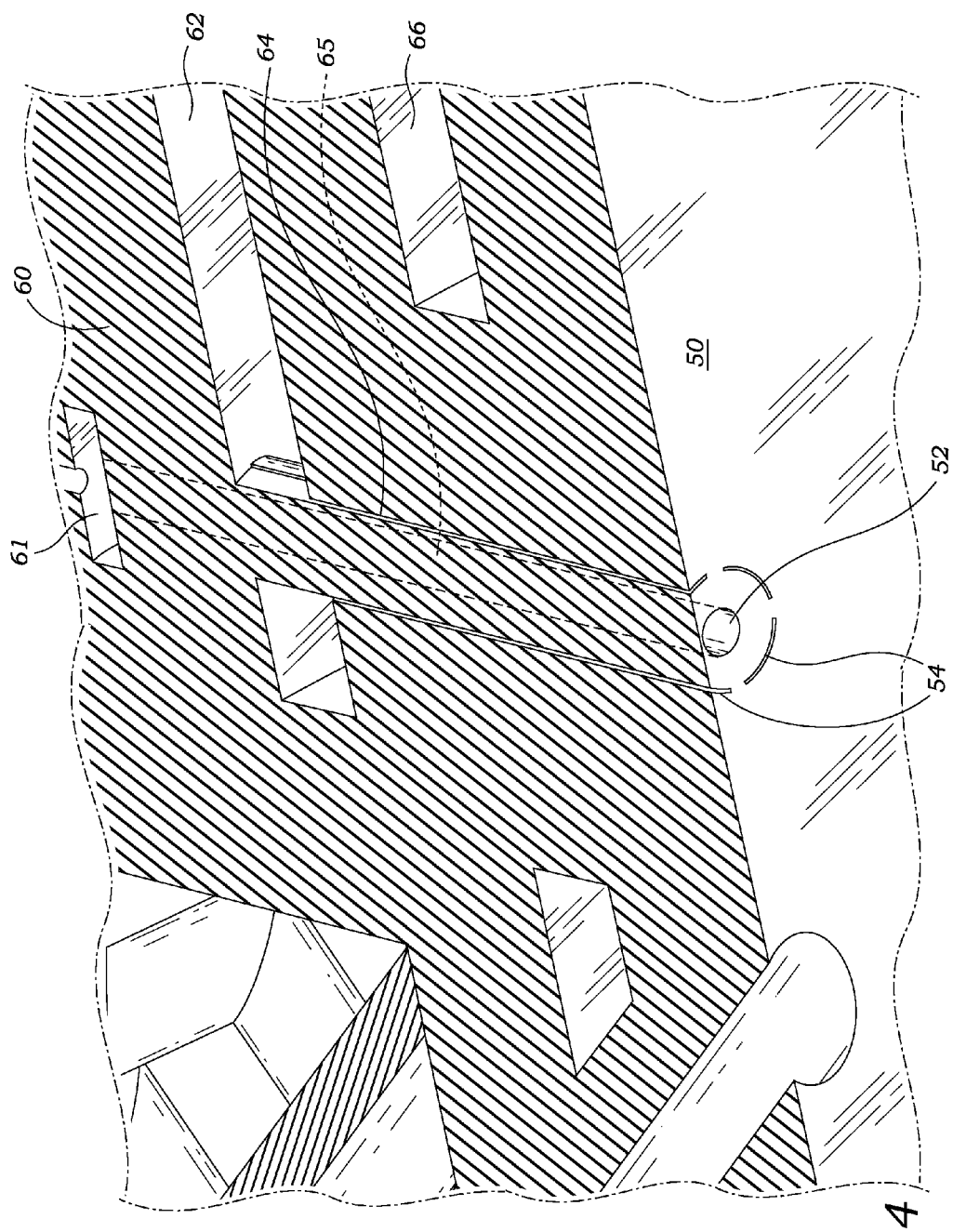
FIG. 4 is a sectional view similar to FIG. 3, illustrating an oxygen injection port and a hydrogen injection port of FIG. 3.

FIG. 4 is a bottom perspective sectional view similar to FIG. 3, only at an upward angle to illustrate an oxygen injection port 52 and a hydrogen injection port 54. As illustrated in FIGS. 3-4, the hydrogen line 41 and the oxygen line 42 (shown in FIG. 3) direct the gas to the to the oxygen injection port 52 and the hydrogen injection port 54, respectively (shown in FIG. 4). As illustrated in FIGS. 3-4, in this embodiment the gasses are directed, along the way, through various structures to prepare the gasses for combustion.

In the embodiment of FIGS. 3-4, the hydrogen line 41 and the oxygen line 42 may enter into the gas generator 10 via an injection manifold 60. The injection manifold 60 is for directing the oxygen and hydrogen to the oxygen injection port 52 and the hydrogen injection port 54, respectively, of the elongate combustion chamber 50 where they are combined into a mixture. The injection manifold 60 includes an oxygen injection chamber 61, a hydrogen injection chamber 62, a hydrogen feedthrough 64, an oxygen feedthrough 65 and an injection manifold water cooling jacket 66.

The oxygen injection chamber 61 and the hydrogen injection chamber 62 serve as a plenums to reduce pressure fluctuations from the oxygen and hydrogen supply lines 42 and 41. In this embodiment, the oxygen injection chamber 61 serves as a conduit between the oxygen line 42 and the oxygen feedthrough 65, and the hydrogen injection chamber 62 serves as a conduit between the hydrogen line 41 and the hydrogen feedthrough 64. While one embodiment of the oxygen injection chamber 61 and the hydrogen injection chamber 62 are shown, those skilled in the art may devise alternative embodiments, and these alternative or equivalent embodiments are considered within the scope of the present invention.

In the embodiment of FIGS. 3 and 4, the oxygen feedthrough 65 is a tube extending from the oxygen injection chamber 61 to the oxygen injection port 52 in the combustion end 22 of the elongate combustion housing 20. In this embodiment, the hydrogen feedthrough 64 is provided by slots surrounding the oxygen feedthrough 65. The slots 64 may be coaxial with the oxygen feedthrough 65, and extend to the hydrogen injection port 54. The slots 64 of this embodiment are not azimuthally contiguous but consist of a plurality of curved segments for the purpose of restraining the oxygen feedthrough 65. This structure facilitates the mixing of the two gasses into a readily combustible mixture. While one embodiment of the oxygen injection port 52 and the hydrogen injection port 54 are shown, those skilled in the art may devise alternative embodiments, and these alternative or equivalent are considered within the scope of the present invention.

It is important to note that in alternative embodiments, the oxygen and hydrogen lines may be interchanged with no loss of functionality regarding the operation of the gas generator 10. All of the uses of the term hydrogen and oxygen are hereby defined to include the inverse, so that a mere reversal of these structures is explicitly within the scope of the claimed invention.

Also shown in FIGS. 3-4, the injection manifold 60 further includes the injection manifold water cooling jacket 66 within the combustion end 22 of the elongate combustion housing 20. The injection manifold water cooling jacket 66 is a space for water from the inlet water line 44 to circulate for cooling the combustion end 22 of the elongate combustion housing 20. Water enters the injection manifold cooling water jacket 66 through the inlet water line 44 and exits through the outlet water line 45. While one embodiment of the injection manifold water cooling jacket 66 is shown, those skilled in the art may devise alternative embodiments, and these alternative or equivalent are considered within the scope of the present invention.

Figure 5:
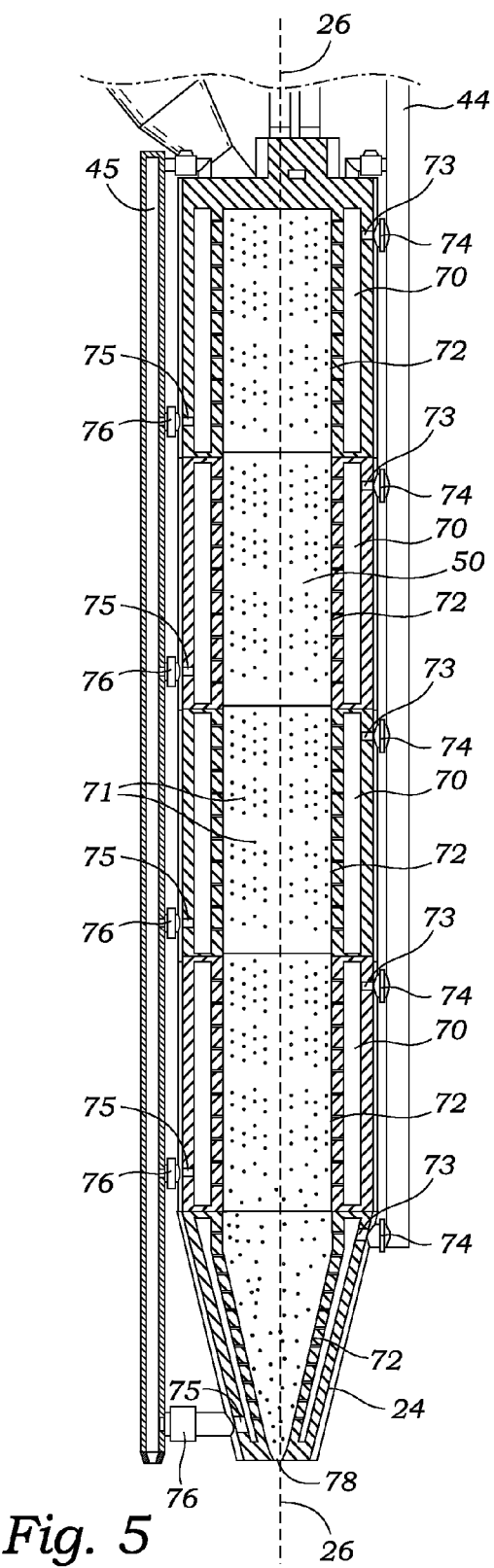
FIG. 5 is a sectional view of the gas generator taken along line 5-5 in FIG. 1.

FIG. 5 is a section view of the gas generator 10 taken through line 5-5 of FIG. 1. As shown in FIG. 5, the gas generator 10 includes a plurality of annular cooling jacket segments 70 that are adapted to receive water from the water inlet line 44 for cooling the elongate combustion housing 20. The elongate combustion housing 20 includes apertures 71 that communicate with the annular cooling jacket segments 70, so that water from the annular cooling jacket segments 70 can flow over an inner surface 72 of the elongate combustion chamber 50 for cooling the elongate combustion housing 20 and protecting it from the extreme temperatures generated within the elongate combustion chamber 50.

As illustrated in FIG. 5, water from the inlet water line 44 is fed through an inlet port 73 into one of the annular cooling jacket segments 70 via an inlet flow control valve 74. As water flows through the annular cooling jacket segment 70, it absorbs heat from the walls of the elongate combustion housing 20. The heated water then exits the annular cooling jacket segment 70 at an outlet port 75 connected to the outlet water line 45, through an outlet flow control valve 76. While we refer to the inlet water line 44 being operably connected to the inlet ports 73, and the outlet water line 45 being operably connected to the outlet ports 75, these terms are also expressly defined to include functionally similar embodiments that utilize multiple lines. The segregation of each of the annular cooling jacket segments 70 serves to increase the control over the temperature of the elongate combustion housing 20 and reduce the occurrence and severity of hot spots forming due to the combustion in the elongate combustion housing 20 during normal use. While one embodiment of the inlet ports 73 and the outlet ports 75 are shown, those skilled in the art may devise alternative embodiments, and these alternative or equivalent are considered within the scope of the present invention.

The present embodiment includes independent control of the flow rate of water into and out of each of the annular cooling jacket segments 70. The water flow through the inlet 74 and outlet flow control valves 76 may be varied independently to control the amount of water going through the annular cooling water jacket segment 70, and also through the apertures 71 and into the elongate combustion chamber 50. For example, if more water is desired to flow through the jacket, to reduce the elongate combustion chamber 50 wall temperature, the flow through the inlet flow control valve 74 and outlet flow control valve 76 is increased. However, if additional water is desired to go into the elongate combustion chamber 50 for the purpose of making steam, only the inlet flow control valve 74 is adjusted to allow more water flow in (and/or the flow through the outlet flow control valve 76 may be reduced).

In the current embodiment, the flow control valves described above may be mass flow controllers. In alternative embodiments, the flow control valves may be any form of valve, regulator, or equivalent device for controlling the flow of water through the annular cooling jacket segments 70 as described herein.

The independent control of the annular cooling jacket segments 70 allows the operator to control internal axial temperature gradients within the elongate combustion housing 20. These thermal gradients may cause undesirable thermal instabilities that may reduce operational efficiency or even damage the device. While FIG. 5 illustrates one embodiment of the annular cooling jacket segments 70, those skilled in the art may devise alternative embodiments, and these alternative or equivalent are considered within the scope of the present invention.

In the embodiment of FIG. 5, the apertures 71 that extend through from the elongate combustion chamber 50 to the annular cooling jacket segments 70. The axis of the apertures 71 in the present embodiment are normal, that is radial, relative to the gas generator axis 26 of the gas generator 10, taken to be in the vertical direction. This orientation is one possible orientation, their axes may have a vertical component to impart a vertical component to the injection of water into the elongate combustion chamber 50. While FIG. 5 illustrates one embodiment of the apertures 71, those skilled in the art may devise alternative embodiments, and these alternative or equivalent are considered within the scope of the present invention.

As illustrated in FIG. 5, the exhaust end 24 is where the combustion products and steam are ejected at high velocity into the reservoir. The exhaust end 24 is shown in the present embodiment as a narrowing of an annular cooling jacket segment 70 into a conical shape. Though the illustrated shape is that of a frustum of a cone it could be ellipsoid or any other narrowing shape and would be considered within the scope of the present invention. One purpose of narrowing the exhaust end 24 is to maintain sufficient pressure within the gas generator 10 such that the produced steam is able to escape into the reservoir. The narrow end of the annular cooling jacket segment 70 contains a restricted orifice 78 for ejecting the high velocity steam into the reservoir. While FIG. 5 illustrates one embodiment of the exhaust end 24, those skilled in the art may devise alternative embodiments, and these alternative or equivalent are considered within the scope of the present invention.

Figure 6:
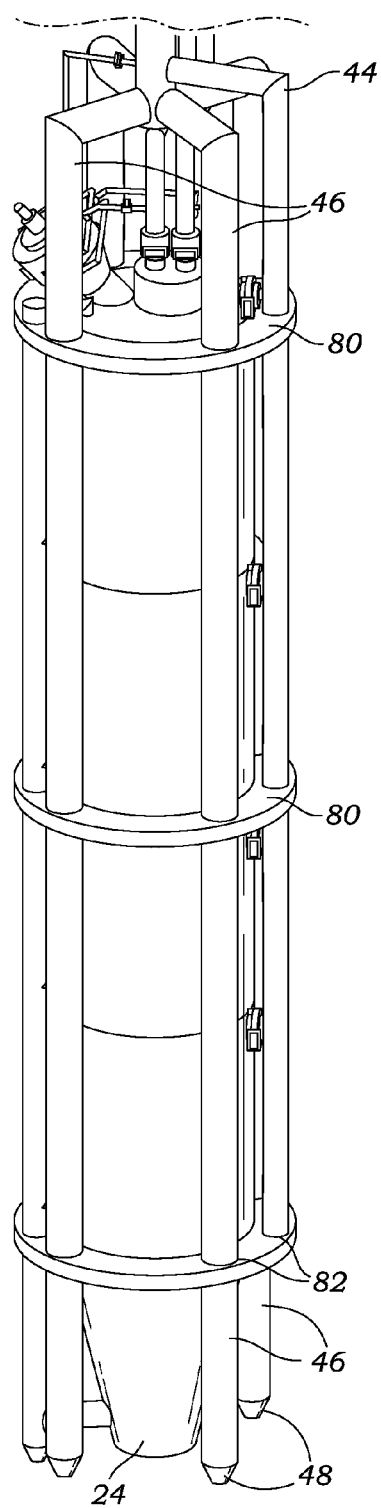
FIG. 6 is a perspective view of the gas generator further including additional water injectors and annular ribs through which the additional water injectors are mounted.

FIG. 6 is a perspective view of one embodiment of the gas generator 10 that further includes support ribs 80 and secondary water lines 46. As shown in FIG. 6, the support ribs 80 are for seating the gas generator 10 in the steam injection tube 12 (Shown in FIG. 8), as well as supporting and protecting the water lines (the inlet water line 44, the outlet water line 45, and the secondary water lines 46). The support ribs 80 of the present embodiment are cylindrical plates shaped to fit within the steam injection tube 12 (Shown in FIG. 8). Each support rib 80 has a gas generator aperture 81 shaped to fit an annular cooling jacket segment 70, as well as a plurality of water line apertures 82 shaped to be threaded by the water lines (and/or other mechanical structures). In the present embodiment the water line apertures 82 are shaped to be threaded by the inlet water line 44, the outlet water line 45, or steam injection water supply lines 40. While FIG. 6 illustrates one embodiment of the support ribs 80, those skilled in the art may devise alternative embodiments, and these alternative or equivalent are considered within the scope of the present invention.

As illustrated in FIG. 6, the secondary water lines 46 inject additional water into the steam plume at the exhaust end 24 to provide additional steam generation as well as temperature control over the steam plume. The secondary water lines 46 may terminate at water supply line nozzles 48. In the present embodiment, the water supply line nozzles 48 direct the water coaxially with the gas generator 10. In another embodiment, the water supply line nozzles 48 may be directed either towards or away from the gas generator axis 26 of the gas generator 10 to alter the density or temperature profile of the steam plume. While FIG. 6 illustrates one embodiment of the water supply line nozzles 48, those skilled in the art may devise alternative embodiments, and these alternative or equivalent are considered within the scope of the present invention.

FIG. 7 is close up of the exhaust end 24 of the gas generator 10, illustrating the restricted orifice 78. As shown in FIG. 7, the restricted orifice 78 restricts the flow of the gases from the elongate combustion chamber 50 (shown in FIG. 5), in this case steam and combustion gases. In the embodiment of FIG. 7, the restricted orifice 78 is shaped to allow a desired flow of steam to escape from the elongate combustion chamber 50, while maintaining desired pressures within the combustion chamber 50. In this embodiment, the exhaust end 24 is narrowed to form a frustum of a cone. While FIG. 7 illustrates one embodiment of the exhaust end 24 and the restricted orifice 78, those skilled in the art may devise alternative embodiments, and these alternative or equivalent are considered within the scope of the present invention.

FIG. 7 also illustrates the water supply line nozzles 48 discussed above. The water supply line nozzles 48 may further include inline valves (not shown) to prevent material from within the reservoir from backflowing into the water lines or elongate combustion chamber 50 when no water or steam injection is taking place through the water supply line nozzles 48 or the restricted orifice 78. The inline valves may include check valves, spring valves, gate valves, ball valves. Those skilled in the art may devise alternative embodiments of the inline valves and these alternative or equivalent are considered within the scope of the present invention.

FIG. 8 is a sectional view of the gas generator 10 operably mounted in a steam injection tube 12 in a borehole 18. As shown in FIG. 8, the gas generator 10 includes a steam injection tube 12 and a packer 14 positioned between the steam injection tube 12 and the borehole 18, in this case a well casing 16 of the borehole 18. The packer 14 functions to keep steam from escaping up the borehole 18 between the steam injection tube 12 and the well casing 16. For purposes of this application, positioning the packer 14 "between the steam injection tube 12 and the borehole 18" is defined to include between the steam injection tube 12 (or the actual gas generator(s) 10, if no steam injection tube 12 is used), and the physical rock/dirt of the borehole 18, or the well casing 16 (if present), and/or any other similar or equivalent installation that may be required and/or devised by one skilled in the art.

As illustrated in FIG. 8, the gas generator 10 may be positioned at a top end of the steam injection tube 12. The steam injection tube 12 may have a tube length TL that is significantly longer than a device length DL of the gas generator 10. In one embodiment, the tube length TL of the steam injection tube 12 in the present embodiment is approximately 5 meters, which is more than twice the length of the device length DL, and it may be about three times the length thereof. While FIG. 8 illustrates one embodiment of the steam injection tube 12, those skilled in the art may devise alternative embodiments, and these alternative or equivalent are considered within the scope of the present invention.

Figure 9:
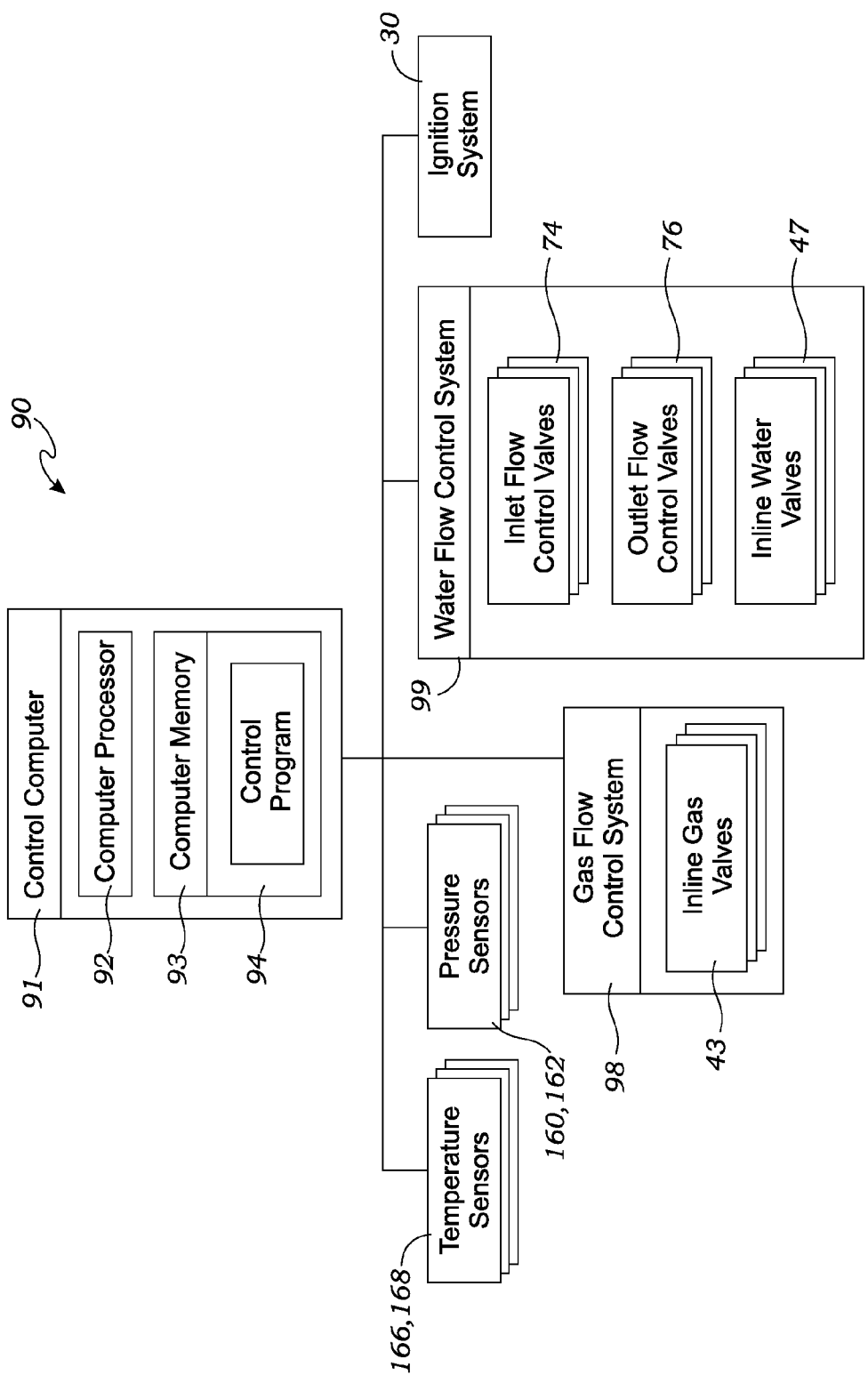
FIG. 9 is a block diagram of one embodiment of a control system for the gas generator.

FIG. 9 is a block diagram of one embodiment of a control system 90 for the gas generator 10. As shown in FIG. 9, the control system 90 includes a control computer 91, pressure sensors 160 and 162, temperature sensors 166 and 168, a gas flow control system 98, a water flow control system 99, and an ignition system 30. These various elements are discussed in greater detail below.

As illustrated in FIG. 9, the control computer 91 includes a computer processor 92, computer memory 93 and a control program 94 operably installed on the computer memory 93. The control program 94 receives data from the pressure sensors 160 and 162, and the temperature sensors 166 and 168, to operably control the generator 10, as discussed in greater detail below. The control program 94 utilizes an algorithm to determine what changes need to be effected to a gas flow control system 98, a water flow control system 99, and the ignition system 30. An example of the control of water flow through the annular cooling jacket segments 70 was given in the detailed description of FIG. 5. The function of these sensors in conjunction with the control program 94 is more fully described in the discussions of FIG. 12.

Figure 10:
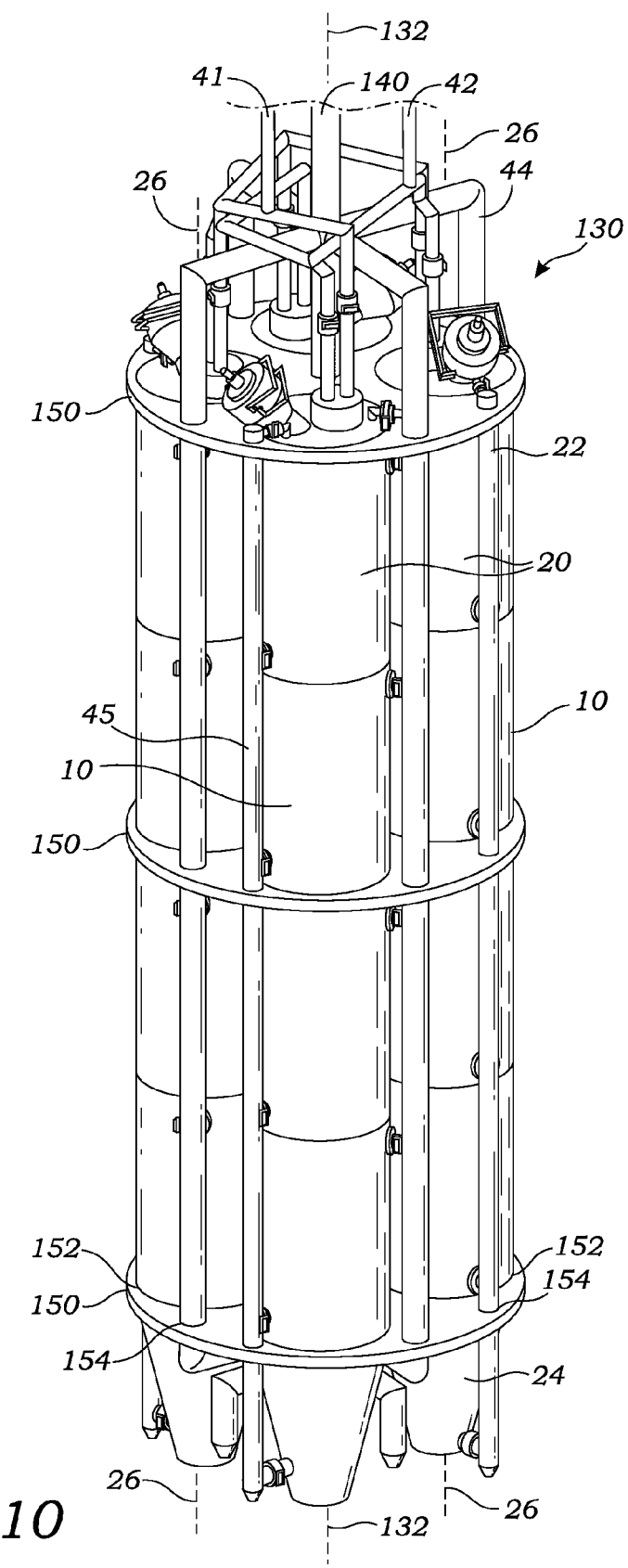
FIG. 10 is a top perspective view of a multiple chamber gas generator system according to another embodiment of the invention.
Figure 11:
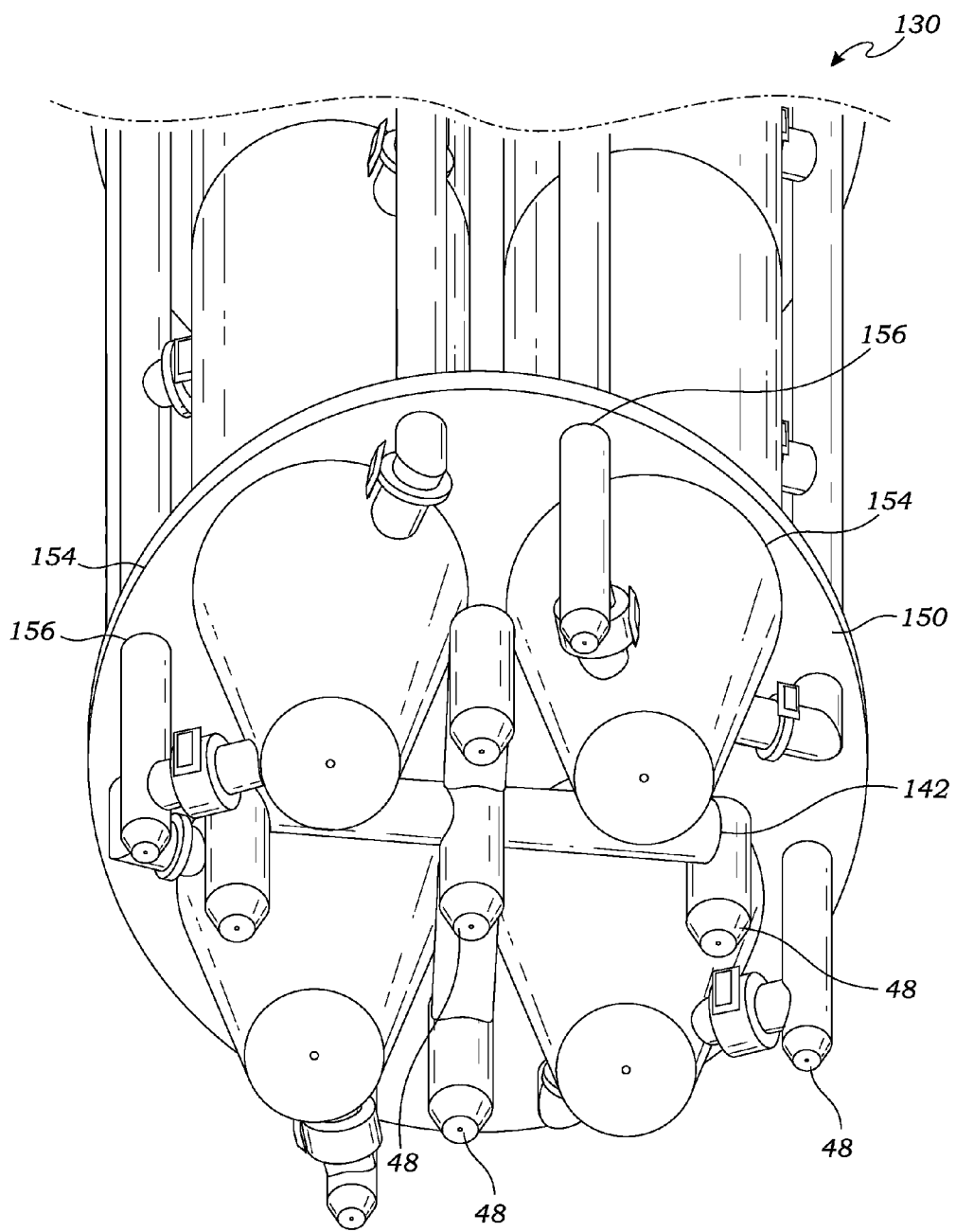
FIG. 11 is a bottom perspective view of a bottom portion of the multiple chamber gas generator system.

FIG. 10 is a top perspective view of a multiple chamber gas generator system 130 according to another embodiment of the invention. FIG. 11 is a bottom perspective view of a bottom portion of the multiple chamber gas generator system 130. As shown in FIGS. 10-11, the multiple chamber gas generator system 130 is a combination of individual gas generators 10, for providing additional control of the steam/water pressure in the steam plume. The multiple chamber gas generator system 130 includes gas generators 10, a primary water line 140, and support ribs 150.

Unless otherwise noted, the individual gas generators 10 may be substantially similar in construction and operation to the single gas generator 10 described above in FIGS. 1-8, or they may have a different construction, as selected by one skilled in the art. The parallel construction of the gas generators 10 provides advantages which will become apparent, with their use described during the discussion below. The multiple chamber gas generator system 130 may contain two, or a plurality, of gas generators 10 arranged to be operated in parallel for the purpose of increased control in injecting steam or water. Their arrangement is taken mostly to be symmetric in the azimuthal direction around a multiple chamber gas generator system axis 132 of the multiple chamber gas generator system 130, however alternate embodiments including any number of individual gas generators 10 and their arrangement is considered equivalent and within the scope of the present invention.

As shown in FIGS. 10-11, the primary water line 140 is for providing a source of water for several components within the multiple chamber gas generator system 130. The primary water line 140 is attached to the inlet water lines 44, one for each of the gas generators 10, for providing water for cooling and steam generation. Also, the primary water line 140 extends axially from the combustion end 22 to the exhaust end 24, between the individual gas generators 10. Though FIGS. 10-11 show the primary water line 140 being along the multiple chamber gas generator system axis 132 of the multiple chamber gas generator system 130, other embodiments are possible, such as the primary water line 140 being offset radially to make room for other components, or having it coil around the individual gas generators 10 for the purpose of drawing heat from the elongate combustion housing 20 by conduction, etc. While FIGS. 10-11 illustrate one embodiment of the primary water line 140, those skilled in the art may devise alternative embodiments, and these alternative or equivalent are considered within the scope of the present invention.

Also as shown in FIGS. 10-11, the primary water line 140 may be connected to a primary water line outlet tree 142. The primary water line outlet tree 142 is comprised of a central outlet tree water line 144 and four tertiary outlet tree water lines 146, with additional or fewer lines possible depending on the application. In the present embodiment, each line of the primary water line outlet tree 142 terminates in a water supply line nozzle 48. Water flows through the primary water line 140, through each line of the tertiary outlet tree water lines 146, and out the water supply line nozzles 48 to inject additional water into the reservoir. In the present embodiment, the primary water line outlet tree 142 replaces the secondary water lines 46 shown in FIG. 6. Alternate embodiments could have secondary water lines 46 in addition to the primary water line 140. The tertiary outlet tree water lines 146 may be "L" shaped, with one end connected to the primary water line 140 and the other end pointing axially in the direction of the steam plume. In another embodiment, valves or mass flow controllers could be placed on each line of the primary water line outlet tree 142 in order to correct or induce azimuthal variations in the steam plume. In yet another embodiment, additional water supply line nozzles 48 could be added radially along each tertiary outlet tree water line 146 in order to have radial profile control of the water injection flow. The number of branches, their configuration, orientation, and any variations thereof by one skilled in the art are considered equivalent and within the scope of the present invention. While FIGS. 10-11 illustrate one embodiment of the primary water line outlet tree 142, those skilled in the art may devise alternative embodiments, and these alternative or equivalent are considered within the scope of the present invention.

Figure 12:
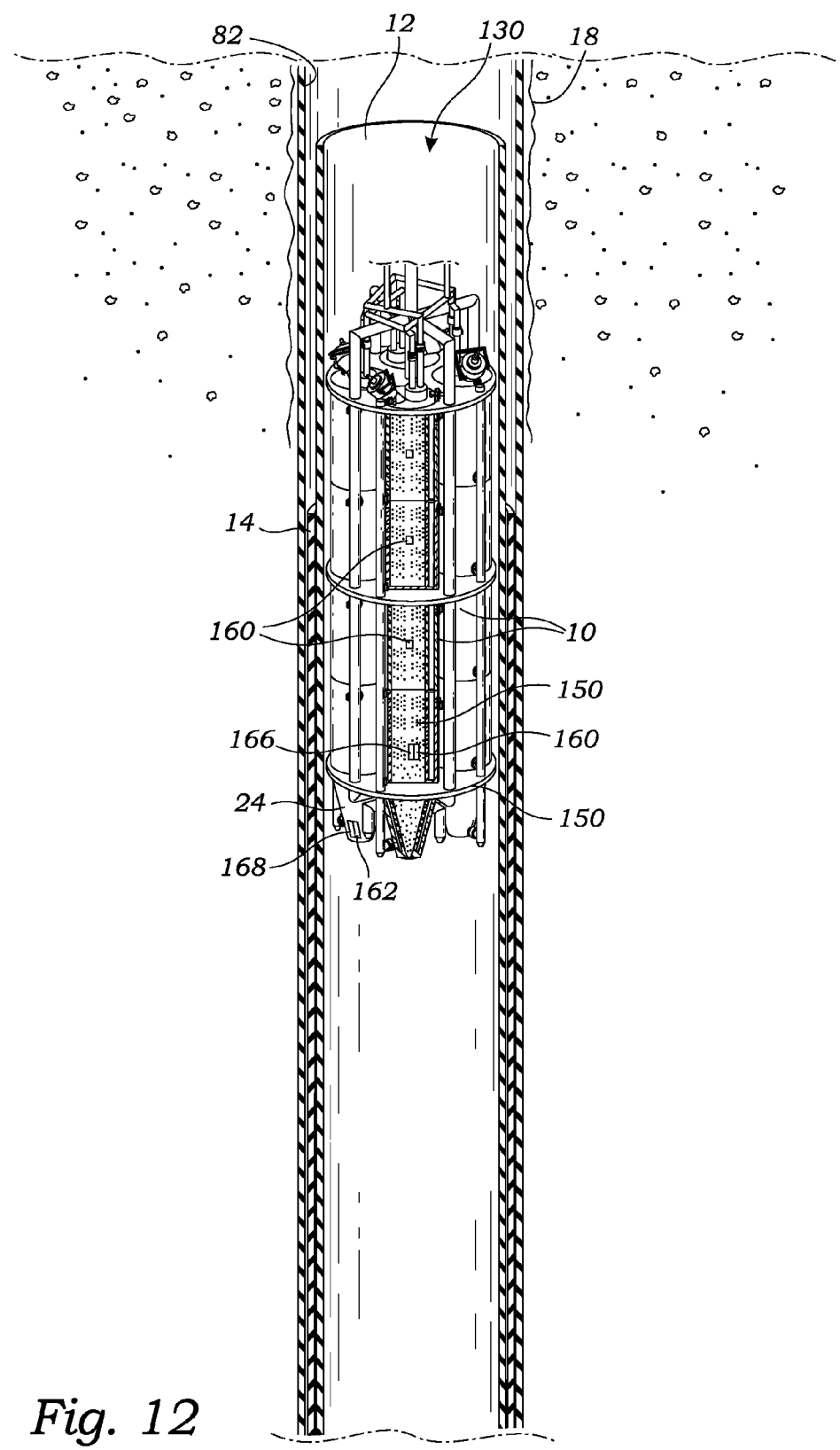
FIG. 12 is a sectional view of the multiple chamber gas generator system, illustrating the multiple chamber gas generator system operably mounted in the steam injection tube.

FIG. 12 is a sectional view of the multiple chamber gas generator system 130, illustrating the multiple chamber gas generator system 130 operably mounted in the steam injection tube 12, with the steam injection tube 12 and one of the gas generators 10 shown in cross-section.

As shown in FIG. 12, the multiple chamber gas generator system 130 includes pressure sensors 160 and 162, and temperature sensors 166 and 168, for sensing pressure and temperature at various points in and around the system 130. In the present embodiment, the system 130 includes at least one chamber pressure sensor 160 positioned within the combustion chamber 50, for sensing pressure within the chamber 50.

In this embodiment, the system 130 also includes a borehole pressure sensor 162 for sensing pressure within the borehole 18. The borehole pressure sensor 162 of this embodiment is mounted on an outer surface of the exhaust end 24 of the elongate combustion housing 20, although it may also be mounted on one of the support ribs 150, on an inner surface 13 of the steam injection tube 12, it could be mounted elsewhere in the formation, and/or on any other suitable location determined by one skilled in the art. For purposes of the location of the pressure and temperature sensors, the term "borehole" is defined to include any external point, either on the outer surface of the system 130, in the steam injection tube 12, or elsewhere in the formation, for sensing pressure being generated within the borehole/formation by the system 130. The pressure sensors may be may be diaphragms sensors, optical sensors, and/or any other equivalent sensor devices known to those skilled in the art. The use of the pressure data gathered is discussed in greater detail below.

Temperature sensors 166 and 168 are provided in a manner similar to the pressure sensors. A chamber temperature sensor 166 may be operably mounted in the chamber 50, and a borehole temperature sensor 169 may be operably mounted in or around the borehole 18, as discussed above. The temperature sensors 166 and 168 are operably connected to the control computer 91 (shown in FIG. 9) so that the control program 94 (shown in FIG. 9) can receive temperature data and control the operation of the inlet flow control valves 74 and the outlet flow control valves 76 (both shown in FIG. 9), as discussed above, to prevent hotspots from forming in the system 130.

The temperature sensors 166 and 168 may be thermocouple sensors, optical temperature sensors, and/or any other equivalent sensor devices known to those skilled in the art. The use of the temperature data gathered is discussed in greater detail below.

The sensors 160, 162, 166, and 168 are operably mounted to provide data on the pressure and temperature conditions in the elongate combustion chamber 50 and also within the steam injection zone. The data from the sensors 160, 162, 166, and 168 is utilized by the control program 94 to control the various operations of the system 130. The control program 94 (of FIG. 9) interprets the data and adjusts the flow of water through the various water lines and through the fuel supply lines and oxidizer supply lines, until the pressure and temperature readings are suitable for stable operation. The control program 94 of the control computer 91 receives the pressure signal from the at least one borehole pressure sensor 160, and functions to selectively turn on or off each of the gas generators 10 in response, so that pressures within the borehole 18 are maintained within a predetermined range of pressures. This may be done either in an open-loop control method, or a closed-loop control method by using the sensor data in a feedback loop. Additionally, individual gas generators 10 may be powered on or off if they are needed to be for stable operation of the overall system.

In use, for example, all four gas generators 10 may initially be used to produce as much petroleum output as possible. If the formation permeability is low, pressure within the reservoir may rise, which can result in a fracture of the reservoir. In this case, when the borehole pressure sensor 162 senses the rise in pressure, the control computer 91 (of FIG. 9) may function to turn off one or more gas generators 10, to lower the pressure. Similarly, if pressure readings get too low, one or more of the gas generators 10 may be brought back online.

As shown in FIGS. 10-12, the individual gas generators 10 in the multiple chamber gas generator system 130 are supported by at least one support rib 150, in this embodiment multiple support ribs 150. As shown in FIG. 12, the support ribs 150 also may function for seating the gas generator 10 in the steam injection tube 12, as well as supporting and protecting the inlet water lines 44 and the outlet water lines 45. The support ribs 150 of the present embodiment are cylindrical plates with an outer perimeter 151 shaped to fit securely against the steam injection tube 12. Each of the support ribs 150 may have gas generator apertures 154 shaped to fit one of the gas generators 10. The support ribs 80 may also have one or more water line apertures 156 shaped to be threaded by the water lines (and/or other mechanical structures coaxial with the gas generator 10). In the present embodiment the water line apertures 156 are shaped to be threaded by inlet water lines 44, outlet water lines 45, or the primary water line 140. Variations in the number and location of the support ribs 150 are considered equivalent and within the scope of the present invention. While FIGS. 10-12 illustrate one embodiment of the support ribs 150, those skilled in the art may devise alternative embodiments, and these alternative or equivalent are considered within the scope of the present invention.

Figure 13:
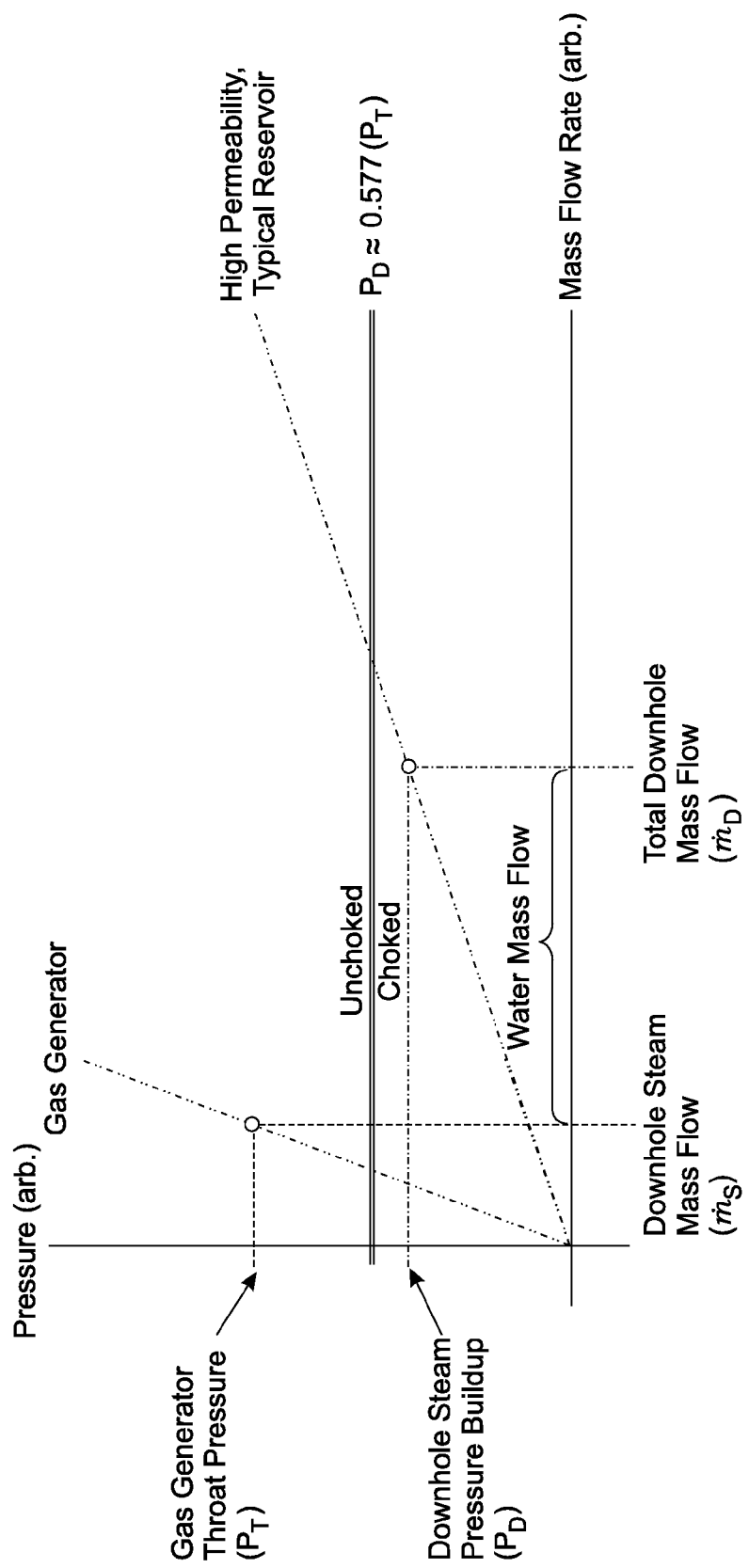
FIG. 13 is a graph of gas pressure vs. mass flow rate for a single gas generator in a high permeability reservoir.

FIG. 13 is a graph of pressure vs. mass flow rate for the throat pressure and the downhole steam injection zone with a single gas generator 10. A preliminary discussion of some terminology and background is needed before further describing FIG. 13. A gas generator 10 has a primary function of ejecting mass, preferably gas such as steam and other combustion gasses, into a borehole for the purpose of adding hydrodynamic pressure to a reservoir. This pressure facilitates extraction of the material (e.g., petroleum products) in the reservoir from the borehole or well, typically in another location. The pressure of the fluid just outside the gas generator, in what is called the steam injection zone, is referred to as the downhole steam injection zone pressure ($P_D$). This pressure, $P_D$, is the result of forcing mass, either steam or water, into the confined space of the steam injection tube/borehole/reservoir. The throat pressure ($P_T$), is the pressure in the elongate combustion chamber 50 immediately on the combustion side of the restricted orifice 78. The pressure within the restricted orifice 78 is much lower due to the small size of the orifice and the high velocity of the injected steam or water. In order to avoid a backflow of material into the elongate combustion chamber we require $$\frac{P_D}{P_T} < 1. \tag{1}$$

If material from the reservoir were to backflow into the elongate combustion chamber 50 it could cause contamination of the elongate chamber 50, instabilities in the combustion process, or even stop the combustion process altogether.

There are two types of mass being injected into the reservoir, water and steam. The steam injection mass flow rate ($\dot{m}_S$) is the mass of the injected steam through the restricted orifice 78 per unit time. The water injection mass flow rate ($\dot{m}_W$) is the sum of the mass of the water injected through the restricted orifice 78 per unit time, and the water injected through the outlet water lines 45, secondary water lines 46, central outlet tree water line 144, or tertiary outlet tree water lines 146 per unit time. The total downhole steam mass flow rate ($\dot{m}_D$) is the sum of the two rates, $$\dot{m}_D = \dot{m}_S + \dot{m}_W. \tag{2}$$

As shown in FIG. 13, the curve for the rocket steam flow relates $\dot{m}_S$ to $P_T$, with a typical operation point shown. Once we define a $\dot{m}_S$ we may then read off the corresponding value of $P_T$. Similarly, the curve for the total downhole steam injection flow (for a reservoir of typical permeability) allows us to again determine the $P_D$ for a given $\dot{m}_D$. In the case shown in FIG. 13, we have a single gas generator 10 and the condition in Eq. 1 is satisfied, thus under standard operation there will be no backflow of material into the elongate combustion chamber 50.

Another requirement is flow through the restricted orifice 78 is always choked. Choked means that the exhaust speed of the injected water or steam is greater than the local sound speed of the water or steam. This is important for stable operation of the gas generator 10, because in the choked condition, acoustic waves cannot propagate up into the elongate combustion chamber 50. Were they to do so, they could incite instabilities in the combustion process which could lead to hot spots in the elongate combustion chamber 50, decreased efficiency of combustion, or a disruption of the combustion process. The approximate pressure ratio for the choked condition, is $$\frac{P_D}{P_T} < 0.577. \quad (3)$$

This puts an upper bound on the allowable pressure in the steam injection zone more restrictive than just the backflow pressure limit given by Eq. 1, thus requiring strict control over the amount of mass flowing into the steam injection zone.

Figure 14:
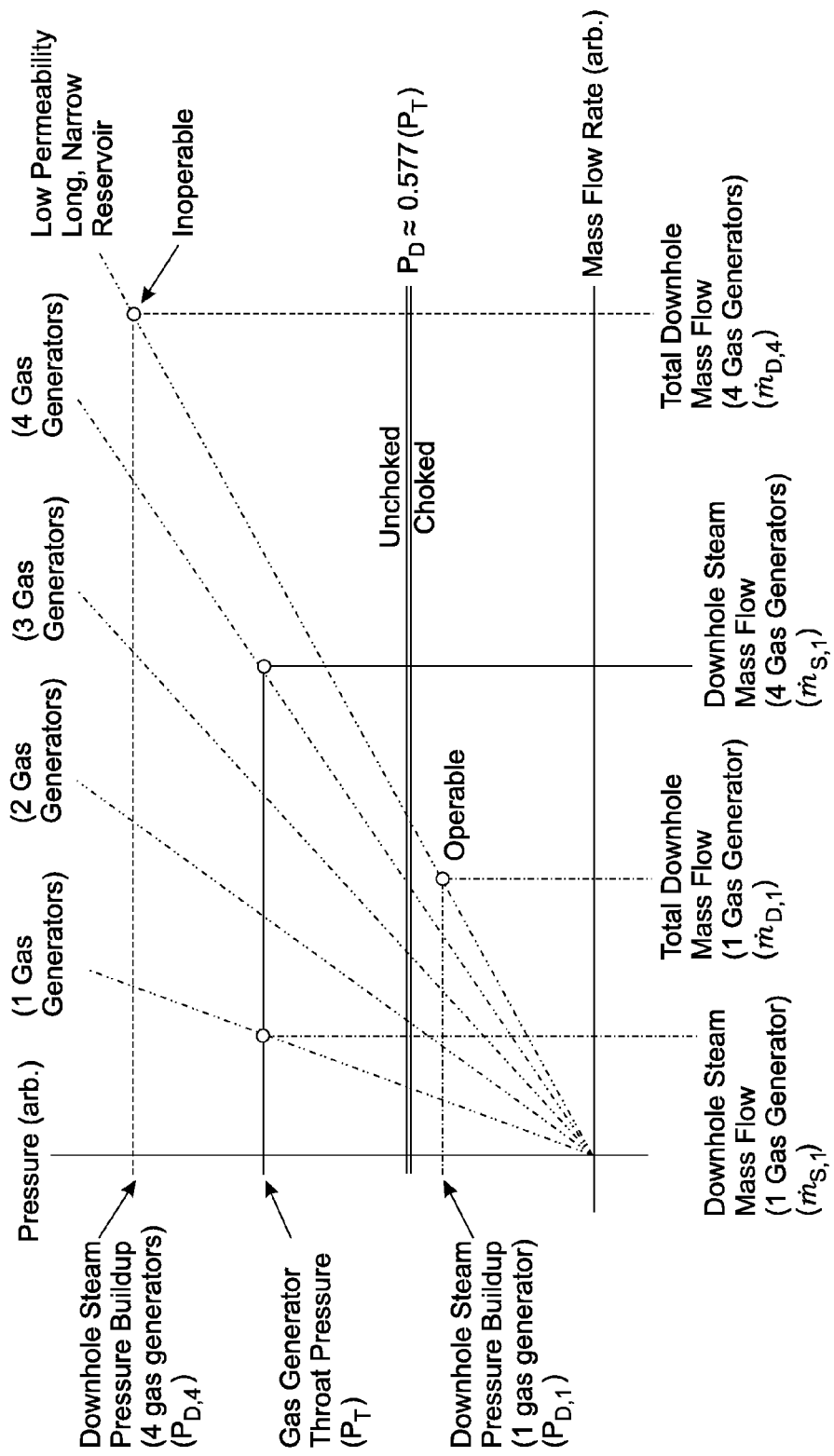
FIG. 14 is a graph of gas pressure vs. mass flow rate for multiple gas generators in a low permeability reservoir.

FIG. 14 is a graph of pressure vs. mass flow rate for the throat and the downhole steam injection zone for multiple gas generators 10 in a low permeability reservoir. Multiple gas generators 10 may be needed to create sufficient pressure in the reservoir. In the case of a reservoir with low permeability, the pressure in the reservoir builds up faster for a given mass flow injection rate. This is shown by the slope of the line for the reservoir being larger than for the high permeability reservoir shown in FIG. 13. In this figure we have a family of curves showing the pressure vs. mass flow rate for the case of 1, 2, 3, or 4 gas generators. This applies when using the multiple chamber gas generator system 130 where one or more gas generators 10 may be off. As in the discussion of FIG. 13, we define the steam mass flow rate of one gas generator 10 as $\dot{m}_{S,1}$, four gas generators 10 as $\dot{m}_{S,4}$, the total mass flow rate of one gas generator 10 as $\dot{m}_{D,1}$, and the total mass flow rate of four gas generators 10 as $\dot{m}_{D,4}$. As before, the curves define the throat pressure as a function of mass flow rate depending on how many gas generators 10 are active. We also take the throat pressure ($P_T$) as independent of the number of gas generators 10 being used. For the given operating points shown in the figure, when considering one gas generator 10, we see that the steam pressure buildup, $P_{D,1}$, is lower than the corresponding throat pressure $P_T$, and also satisfies the choked condition. However, with four gas generators 10 operational, the steam pressure buildup, $P_{D,4}$, exceeds $P_T$, satisfying neither the constraint of no backflow, Eq. 1, nor the choked condition, Eq. 3. Though not shown in FIG. 14, the total downhole pressure is the sum of the pressure introduced by the gas generators 10 and the base pressure of the reservoir. One cannot simply reduce the flow rates arbitrarily as the reservoir pressure would exceed the choking condition. The only way to reduce the flow rates beyond a certain point is to entirely turn off one or more gas generators 10. As an example, one possible condition is when the total downhole pressure imparted by the gas generators 10, when running at a minimum mass flow rate while still choked, exceeds the maximum reservoir pressure. In this case, individual gas generators 10 need to be turned off to reduce the pressure. This illustrates the need for being able to turn off individual generators 10 depending on the conditions in the reservoir. The present invention satisfies this need with the parallel design of the multiple chamber gas generator system 130.

Figure 15:
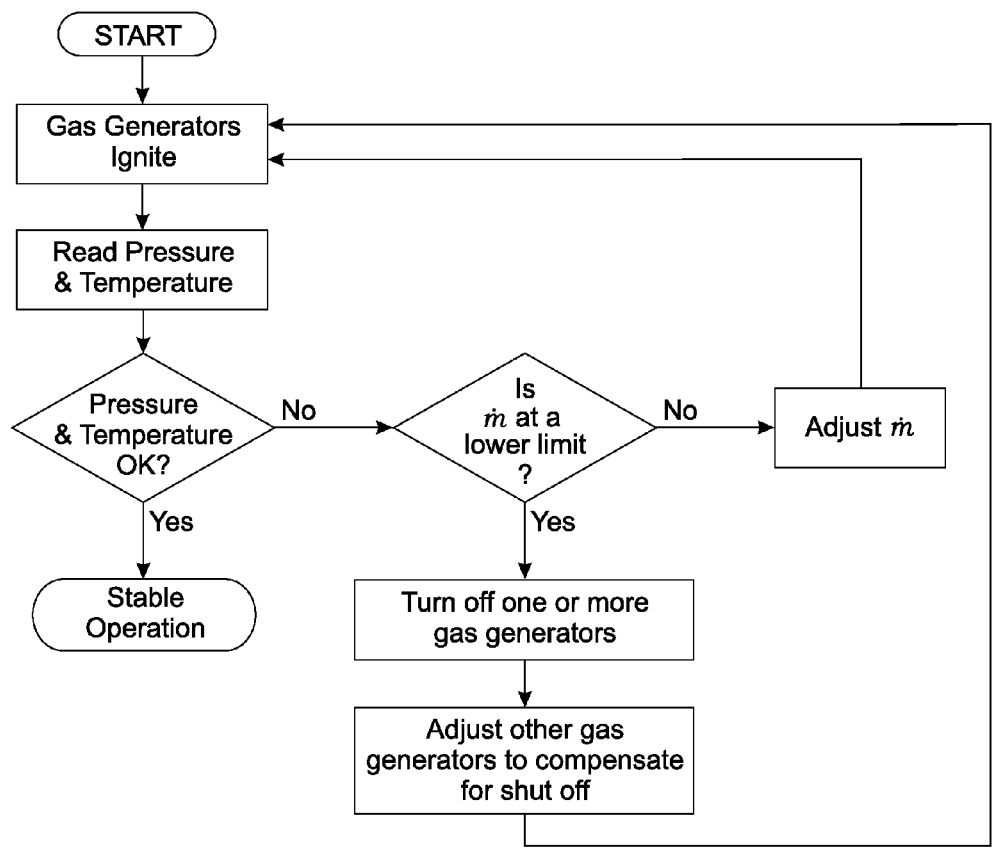
FIG. 15 is a flow chart of the operation of the multiple chamber gas generator system operation.

FIG. 15 is a flow chart of the operation of the multiple chamber gas generator system 130 operation. The purpose of this flow chart is to illustrate a simplified control scheme that can be used to take advantage of the operational flexibility in the present invention in varying the pressure in the steam injection zone. In this flow chart we consider a scenario of an over-pressure in the steam injection zone. First, the injection process is initiated, and one or more gas generators 10 ignite and begin to inject steam and water into the steam injection zone. During the process the pressure and temperature are read by the pressure sensors 97 and the temperature sensors 160 and 162 to determine both the absolute pressure in the elongate combustion chamber 50 and in the steam injection zone. Monitoring the pressure in the elongate combustion chamber 50 is critical for not damaging the gas generators 10. The pressure differential is critical for maintaining the no backflow condition (Eq. 1) and the choked condition (Eq. 3). If the pressure is out of range, the control program 94 determines if $\dot{m}_D$ is at a lower operational limit. Recall that we have lower bounds for pressure in the combustion chamber. If $\dot{m}_D$ is not at a lower limit, then it may be reduced and the pressure and temperature rechecked as before. If $\dot{m}_D$ is at a lower limit, then a single gas generator 10 may be turned off entirely, with the other gas generators 10 adjusting their flow rates to minimize any instantaneous pressure discontinuities due to the shutoff. The pressure and temperature are then reread and the loop continues with the gas generators 10 adjusting their output until the choked condition is satisfied for all gas generators 10 presently in operation. At this point the process is considered stable and the feedback loop continues to monitor pressure and temperature for any changes. It should also be noted that this particular control loop is also valid for the operation of a single gas generator 10 as described in FIGS. 1-9. With a single gas generator 10, if the pressure cannot be made to be in an acceptable range, the gas generator 10 shuts down and other steps will need to be taken.

Figure 16:
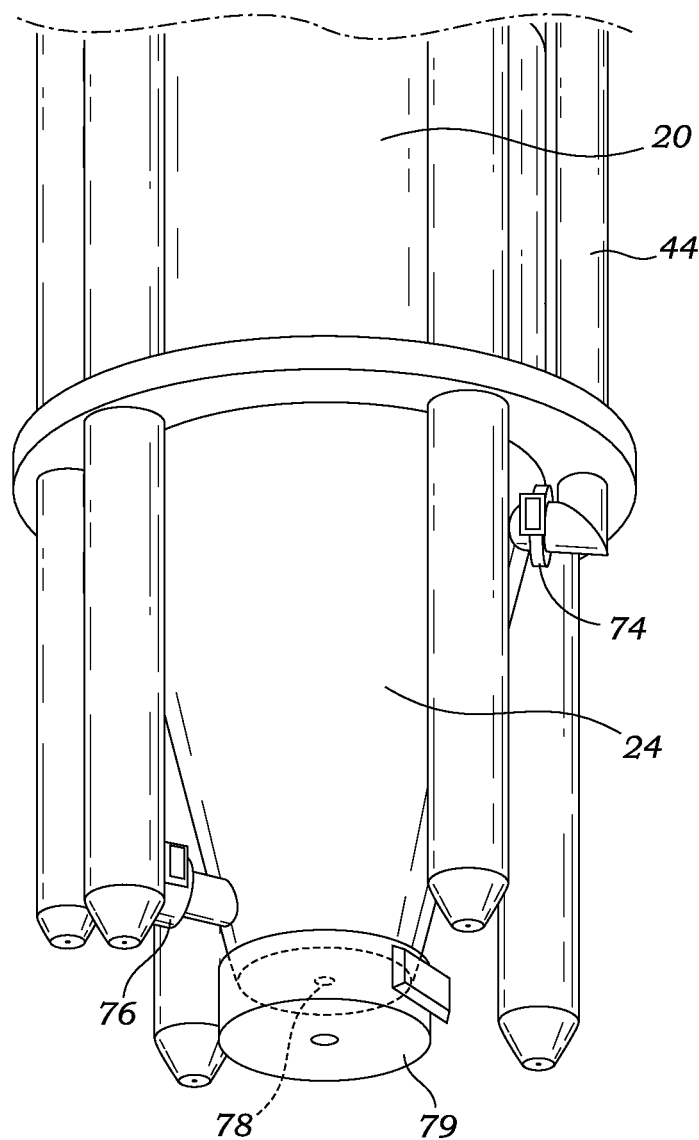
FIG. 16 is a close up of the exhaust end of one embodiment of the gas generator, wherein the gas generator includes an inline steam valve.

FIG. 16 is a close up of the exhaust end 24 of another embodiment of the gas generator 10, illustrating an inline steam valve 79 connected to the exhaust end 24 of the elongate combustion housing 20. The inline steam valve 79 is for sealing the elongate combustion chamber 50 (Shown in FIG. 5) when the gas generator 10 is not ejecting steam. This serves to keep material from backflowing through the restricted orifice 78 into the elongate combustion chamber 50 causing contamination that would inhibit the combustion process. It also prevents material from the reservoir from causing obstructions in the hydrogen injection port 54, the oxygen injection port 52 (Shown in FIG. 5), the apertures 71 (Shown in FIG. 5), the inlet ports 73 (Shown in FIG. 5), or the outlet ports 75 (Shown in FIG. 5). The inline steam valve 79 may be any type of valve suitable for use in such an environment, including gate valves, check valves, etc. As shown in FIG. 16, the inline steam valve 79 is on the steam injection zone side of the restricted orifice 78. In other embodiments, the inline steam valve 79 may be within the restricted orifice 78 or within the elongate combustion chamber 50 abutting the restricted orifice 78, and such placement of the inline steam valve 79 by those skilled in the art are considered equivalent and within the scope of the present invention. In yet another embodiment, the inline steam valves 79 may be of a construction that uses the thermal expansion of constituent materials to open the valve, thus reducing or eliminating the need for moving mechanical parts, as well as providing a normally closed condition that would passively seal the elongate combustion chamber 50 in the event of a combustion failure or intentional shut-off. While FIG. 16 illustrates one embodiment of the inline steam valve 79, those skilled in the art may devise alternative embodiments, and these alternative or equivalent are considered within the scope of the present invention.

As used in this application, the terms computer, processor, memory, and other computer related components, are hereby expressly defined to include any arrangement of computer(s), processor(s), memory device or devices, and/or computer components, either as a single unit or operably connected and/or networked across multiple computers (or distributed computer components), to perform the functions described herein.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A multiple chamber gas generator system for generating gasses in a borehole for use in the recovery of petroleum products, the multiple chamber gas generator system comprising:
    a plurality of gas generators shaped to fit within the borehole, each of the gas generators having an elongate combustion chamber;
    a gas flow control system operably installed for supplying a fuel and an oxidizing agent to the elongate combustion chambers of each of the gas generators, for combustion;
    a control computer having a computer processor, a computer memory, and a control program operatively installed in the computer memory;
    wherein the control program functions to control the operation of the gas flow control system and to selectively turn on or off each of the gas generators to regulate the volume of gasses being generated in response to changes in pressure within the borehole; and
    further comprising a plurality of support ribs that structurally connect the plurality of gas generators, each of the plurality of support ribs having a plurality of gas generator apertures that are each shaped to receive one of the plurality of gas generators.

2. The multiple chamber gas generator of claim 1, wherein each of the gas generators is disposed on a gas generator axis, and wherein the gas generators are disposed in parallel.

3. The multiple chamber gas generator of claim 2, wherein the gas generators are operably mounted in parallel within a steam injection tube that has an axis that is parallel to all of the gas generator axes.

4. The multiple chamber gas generator system of claim 1, wherein each of the plurality of support ribs has an outer perimeter that is shaped to engage a steam injection tube that fits around the plurality of gas generators.

5. A multiple chamber gas generator system for generating gasses in a borehole for use in the recovery of petroleum products, the multiple chamber gas generator system comprising:
    a plurality of gas generators shaped to fit within the borehole, each of the gas generators having an elongate combustion chamber;
    a gas flow control system operably installed for supplying a fuel and an oxidizing agent to the elongate combustion chambers of each of the gas generators, for combustion;
    a control computer having a computer processor, a computer memory, and a control program operatively installed in the computer memory;
    wherein the control program functions to control the operation of the gas flow control system and to selectively turn on or off each of the gas generators to regulate the volume of gasses being generated in response to changes in pressure within the borehole;
    a water flow control system operably installed for supplying water to each of the elongate combustion chambers; and
    wherein the control program functions to control the operation of the water flow control system to maintain the elongate combustion chambers within a predetermined range of temperatures.

6. The multiple chamber gas generator of claim 5, further comprising at least one chamber pressure sensor operably mounted for sensing pressure within the combustion chamber.

7. A multiple chamber gas generator system for generating gasses in a borehole for use in the recovery of petroleum products, the multiple chamber gas generator system comprising:
    at least two gas generators shaped to fit within the borehole, each of the at least two gas generators comprising:
        a combustion housing and a combustion chamber;
        a combustion end and an exhaust end of the combustion chamber;
        an oxygen injection port in the combustion end of the combustion chamber for injecting oxygen or other oxidizing agent into the combustion chamber;
        a hydrogen injection port in the combustion end of the combustion chamber for injecting hydrogen or other fuel into the combustion chamber adjacent the oxygen injection port;
        an ignition system operably mounted on the combustion end of the combustion housing for igniting the oxygen or other oxidizing agent and the hydrogen or other fuel from the oxygen injection port and the hydrogen injection port; and
        a restricted orifice at the exhaust end of the combustion chamber for allowing gasses or fluids from the combustion chamber to exit the combustion chamber and enter the borehole;
    a gas flow control system having hydrogen lines, oxygen lines, and a plurality of inline gas valves, operably installed for supplying the hydrogen or other fuel and the oxygen or other oxidizer to the hydrogen injection port and the oxygen injection port, respectively, of each of the at least two combustion chambers;
    a water flow control system having inlet water lines, outlet water lines, a plurality of inline water valves, a plurality of water supply line nozzles, and a primary water line, operably installed for supplying water to the gas generator or to a steam injection zone;
    at least one pressure sensor for sensing the pressure in the borehole; and a control computer having a computer processor, a computer memory, and a control program operatively installed in the computer memory, for receiving the sensor data from the at least one pressure sensor and controlling the operation of the gas flow control system to turn on or off each of the at least two combustion chambers to optimize the generation of gas into the borehole without allowing the pressure in the borehole to exceed a maximum pressure of the gas generator.

8. The multiple chamber gas generator system of claim 7, further comprising:
a plurality of annular cooling jacket segments surrounding the combustion chamber, each of the plurality of annular cooling jacket segments having an inlet port and an outlet port for allowing water to flow therethrough;
an inlet water line operably connected to the inlet ports of the plurality of annular cooling jacket segments;
an outlet water line operably connected to the outlet ports of the plurality of annular cooling jacket segments; and
a plurality of apertures through the combustion housing allowing water to flow from the plurality of annular cooling jacket segments into the combustion chamber.

9. The multiple chamber gas generator system of claim 8, further comprising a water flow control system for regulating the flow of water through each of the plurality of annular cooling jacket segments, the water flow control system comprising:
a plurality of inlet flow control valves, each of the inlet flow control valves being operatively installed in the inlet port of one of the plurality of annular cooling jacket segments for controlling water flow into the annular cooling jacket segment; and
a plurality of outlet flow control valves, each of the outlet flow control valves being operatively installed in the outlet port of one of the plurality of annular cooling jacket segments for controlling water flow out of the annular cooling jacket segment.

10. The multiple chamber gas generator system of claim 8, wherein the plurality of inlet flow control valves and the plurality of outlet flow control valves are mass flow controllers.

11. The multiple chamber gas generator system of claim 7, further comprising a control system for regulating the flow of water through each of the plurality of annular cooling jacket segments, the control system comprising:

a plurality of inlet flow control valves, each of the inlet flow control valves being operatively installed in the inlet port of one of the plurality of annular cooling jacket segments for controlling water flow into the annular cooling jacket segment;
a plurality of outlet flow control valves, each of the outlet flow control valves being operatively installed in the outlet port of one of the plurality of annular cooling jacket segments for controlling water flow out of the annular cooling jacket segment;
a plurality of temperature sensors operatively placed on or adjacent the combustion housing adjacent each of the annular cooling jacket segments, for producing sensor data indicating temperatures sensed;
a control computer having a computer processor, a computer memory, and a control program operatively installed in the computer memory, for receiving the sensor data from the temperature sensors and controlling the operation of the inlet and outlet flow control valves to control the mass of water into and out of each of the plurality of annular cooling jacket segments to maintain the temperature of the combustion housing within an acceptable range.

12. The multiple chamber gas generator system of claim 11, wherein the control program of the control computer functions, in response to temperature increases above a given threshold, to increase the flow of water into one of the plurality of annular cooling jacket segments, without proportionately increasing the flow of water out of the annular cooling jacket segment, thereby forcing water to flow from the annular cooling jacket segment through the plurality of apertures and into the combustion chamber, for cooling the combustion housing.

13. The multiple chamber gas generator system of claim 7, further comprising a packer operably mounted around a steam injection tube within which the plurality of gas generators are mounted.

14. The multiple chamber gas generator system of claim 7, wherein the gas valves are mass flow controllers.

15. The multiple chamber gas generator system of claim 7, wherein the water supply line nozzles include inline water valves.

16. The multiple chamber gas generator system of claim 7, wherein the restricted aperture includes an inline steam valve.

* * * * *